(12) United States Patent
King

(10) Patent No.: US 7,587,708 B2
(45) Date of Patent: Sep. 8, 2009

(54) METHOD FOR TESTING CONVERTED SOURCE CODE

(75) Inventor: Robert L. King, Vestal, NY (US)

(73) Assignee: International Business Machines Corporation, Armonk, NY (US)

( * ) Notice: Subject to any disclaimer, the term of this patent is extended or adjusted under 35 U.S.C. 154(b) by 1149 days.

(21) Appl. No.: 10/894,839

(22) Filed: Jul. 20, 2004

(65) Prior Publication Data

US 2006/0020919 A1    Jan. 26, 2006

(51) Int. Cl.
*G06F 9/44* (2006.01)
*G06F 9/45* (2006.01)

(52) U.S. Cl. .................. 717/124; 717/145; 717/151
(58) Field of Classification Search ................. None
See application file for complete search history.

(56) References Cited

U.S. PATENT DOCUMENTS

| | | | | |
|---|---|---|---|---|
| 5,815,713 | A * | 9/1998 | Sanders | 717/106 |
| 6,430,741 | B1 * | 8/2002 | Mattson et al. | 717/154 |
| 6,526,523 | B1 | 2/2003 | Chen et al. | |
| 6,651,096 | B1 | 11/2003 | Gai et al. | |
| 6,675,381 | B1 | 1/2004 | Yamaguchi | |
| 2002/0040273 | A1 | 4/2002 | John et al. | |
| 2003/0018932 | A1 * | 1/2003 | Blum et al. | 714/46 |
| 2003/0110464 | A1 | 6/2003 | Davidson et al. | |
| 2003/0220987 | A1 | 11/2003 | Pearson | |

OTHER PUBLICATIONS

Tahvildari et al., "Quality-Driven Software Re-engineering", May 2002, Elsevier Science Inc., pp. 225-239.*
William E. Howden, "Confidence-Based Reliability and Statistical Coverage Estimation", 1997 IEEE, pp. 283-291.*
William E. Howden, "System Testing and Statistical Test Data Coverage", 1997 IEEE, pp. 500-504.*
Deng et al., "Empirical Studies of Test Effectiveness and Delivered Reliability", Polytechnic University, Brooklyn, NY, pp. 1-26.*

* cited by examiner

*Primary Examiner*—Tuan Q Dam
*Assistant Examiner*—Ben C Wang
(74) *Attorney, Agent, or Firm*—Schmeiser, Olsen & Watts; William E. Schiesser

(57) ABSTRACT

A method, computer program product, and computer system for testing converted source code features appearing in computer software of a computer system. N iterations are performed. Each iteration identifies M converted source code features appearing in P computer programs of the computer software. The M converted source code features have been converted by compiler conversion software in order that the P computer programs may be compiled into executable program codes by a new version of a compiler. Additionally, each selects P1 computer programs of the P computer programs for subsequent testing of the P1 computer programs. P1 is less than P. The P1 computer programs are selected such that the testing may be used to determine to a degree of confidence to which the compiler conversion software has correctly converted the M source code features in the P computer programs.

37 Claims, 4 Drawing Sheets

FIG. 3

| Special Conditions | Confidence Interval (CI) | No. of Computer Programs (P) | Testing Sample Size (P1) |
|---|---|---|---|
| None | .05 | 30 | 28 |
| | | 100 | 80 |
| | | 300 | 169 |
| | | 1000 | 278 |
| | | 3000 | 341 |
| | | 10000 | 370 |
| | | ∞ | 384 |
| Few | .0375 | 30 | 29 |
| | | 100 | 87 |
| | | 300 | 209 |
| | | 1000 | 406 |
| | | 3000 | 556 |
| | | 10000 | 639 |
| | | ∞ | 683 |
| Some | .025 | 30 | 29 |
| | | 100 | 94 |
| | | 300 | 251 |
| | | 1000 | 606 |
| | | 3000 | 1016 |
| | | 10000 | 1332 |
| | | ∞ | 1537 |
| Many | 0 | P | P(100% testing) |

METHOD FOR TESTING CONVERTED SOURCE CODE

BACKGROUND OF THE INVENTION

1. Technical Field

The present invention relates to a method, computer program product, and a computer system for testing converted source code features appearing in computer software of a computer system.

2. Related Art

When a new version of a compiler is installed in a facility, existing computer programs to be compiled by the new version of the compiler may need to be converted to be syntactically compatible with the new version of the compiler, especially if the new version of the compiler implements a new version of its computer programming language. Conversion of the existing computer programs may be followed by extensive testing of the newly converted computer programs in order to ensure that the newly converted computer programs execute correctly. This extensive testing is expensive due to the time and resources required to support this testing. Accordingly, there is a need for a less expensive method for testing the newly converted computer programs.

SUMMARY OF THE INVENTION

The present invention provides a method for testing converted source code features appearing in computer software of a computer system, said method comprising performing N iterations, said N being at least 1, wherein performing each iteration of the N iterations comprises performing the steps of:

identifying M converted source code features appearing in each computer program of P computer programs of said computer software, said M converted source code features having been converted by compiler conversion software in order that said P computer programs may be compiled into executable program codes by a new version of a compiler, said P being at least 10, said M being at least 1; and selecting P1 computer programs of said P computer programs for subsequent testing of said P1 computer programs, said P1 being less than P, said P1 computer programs being selected such that said testing of the P1 computer programs may be used to determine to a degree of confidence whether said compiler conversion software has correctly converted said M source code features in said P computer programs.

The present invention provides a computer program product, comprising a computer usable medium having a computer readable program code embodied therein, said computer readable program code comprising an algorithm adapted to implement a method for testing converted source code features appearing in computer software of a computer system, said method comprising the steps of:

identifying M converted source code features appearing in each computer program of P computer programs of said computer software, said M converted source code features having been converted by compiler conversion software in order that said P computer programs may be compiled into executable program codes by a new version of a compiler, said P being at least 10, said M being at least 1; and selecting P1 computer programs of said P computer programs for subsequent testing of said P1 computer programs, said P1 being less than P, said P1 computer programs being selected such that said testing of the P1 computer programs may be used to determine to a degree of confidence whether said compiler conversion software has correctly converted said M source code features in said P computer programs, said P1 being less than P.

The present invention provides a computer system comprising a processor and a computer readable memory unit coupled to the processor, said memory unit containing instructions that when executed by the processor implement a method for testing converted source code features appearing in computer software of said computer system, said method comprising the computer implemented steps of:

identifying M converted source code features appearing in each computer program of P computer programs of said computer software, said M converted source code features having been converted by compiler conversion software in order that said P computer programs may be compiled into executable program codes by a new version of a compiler, said P being at least 10, said M being at least 1; and selecting P1 computer programs of said P computer programs for subsequent testing of said P1 computer programs, said P1 being less than P, said P1 computer programs being selected such that said testing of the P1 computer programs may be used to determine to a degree of confidence whether said compiler conversion software has correctly converted said M source code features in said P computer programs, said P1 being less than P.

The present invention advantageously provides a less expensive method than currently exists in the prior art for testing computer programs which have been converted so to be syntactically compatible with a new version of a compiler that is adapted to compile said computer programs.

BRIEF DESCRIPTION OF THE DRAWINGS

FIG. 3 is a table indicating a sample size for testing a given number of computer programs under various special conditions for an assumed 95% confidence factor, in accordance with embodiments of the present invention.

FIG. 3 is a table indicating a testing sample size (P1) for assessing whether a given number of computer programs (P) have been correctly converted by the compiler conversion software, under various special conditions for an assumed 95% confidence factor, in accordance with embodiments of the present invention.

DETAILED DESCRIPTION OF THE INVENTION

Figure 1:
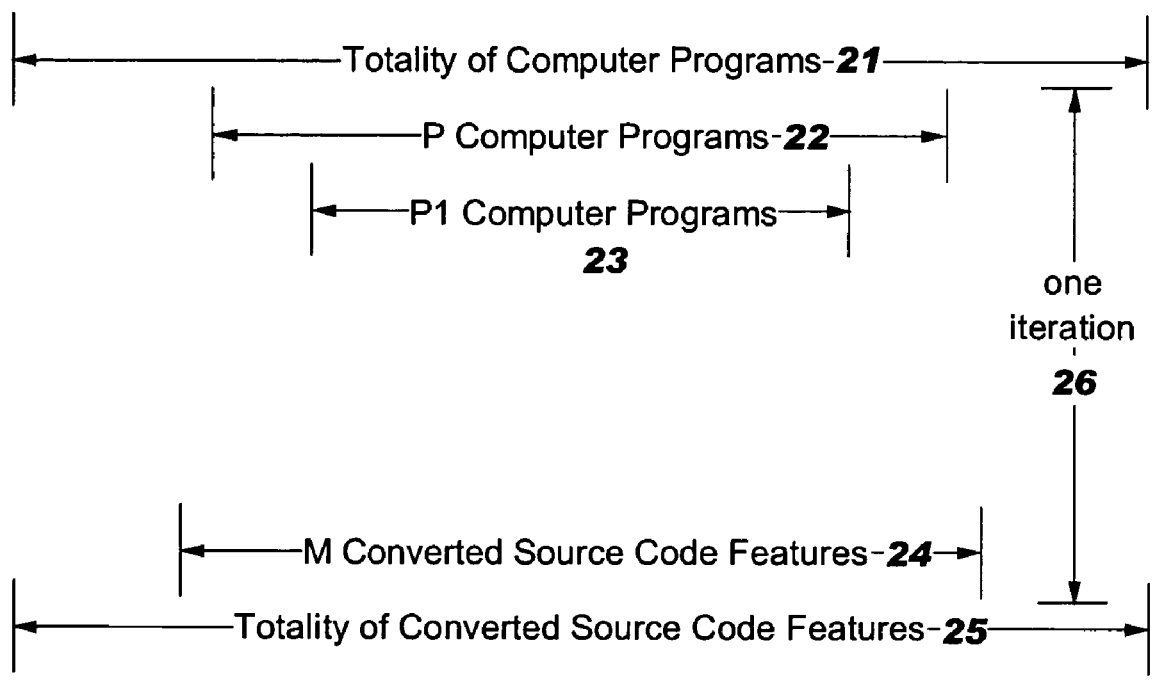
FIG. 1 depicts relationships between computer programs and converted source code features appearing in the computer programs, in accordance with embodiments of the present invention.

When a new version of a compiler (e.g., a COBOL compiler, a FORTRAN compiler, a PL/I compiler, a C++ compiler, etc.) is installed in a facility, accompanying compiler conversion software may be provided for automatically converting computer programs comprised by the facility, so as to make said computer programs syntactically compatible with the new compiler. The compiler conversion software generates converted source code features in the converted computer programs to reflect the syntax requirements of the new compiler. The following examples illustrate possible converted source code feature for a COBOL compiler. A first example of a converted source code feature for a COBOL compiler is that the COBOL EXAMINE statement is replaced by an INSPECT statement and the statement MOVE ZERO TO TALLY is added in front of it. A second example of a converted source code feature for a COBOL compiler is that the COBOL EXHIBIT statement is replaced by a DISPLAY statement. A third example of a converted source code feature for a COBOL compiler is that if the continuation of a COBOL nonnumeric literal begins in Area A, it is shifted to the right until its whole length lies within Area B. A fourth example of a converted source code feature for a COBOL compiler is that a suffix is appended to all user defined words that are reserved words in the target language.

It is possible, however, that errors might exist in the compiler conversion software. Therefore, a verification process is needed to determine whether the converted computer programs have been correctly converted by the compiler conversion software. All of the converted computer programs may be tested to determine if they execute correctly. However, testing all of the converted computer programs is expensive.

Accordingly, the present invention focuses on the converted source code features as the basic element of testing instead of on the converted computer programs as the basic element of testing. The basic idea behind the focus on the converted source code features as the basic element of testing is that the compiler conversion software generates systemic errors in converted source code features which invariably and consistently occur in all computer programs comprising the converted source code features. Therefore, it is not necessary to test all computer programs which comprise a given set of source code features. For example, if M source code features appear in each of P computer programs, P1 computer programs of the P computer programs, wherein P1<P, may be tested to determine to a degree of confidence whether the compiler conversion software has correctly converted the M source code features in the P computer programs. When P is large (e.g., P=1000 or more), P1 may be significantly less than P, and a successful outcome of the testing of the P1 computer programs may provide a high level of confidence (statistically) that all P computer programs have been correctly converted by the compiler conversion software.

FIG. 1 depicts relationships between computer programs and converted source code features appearing in the computer programs, in accordance with embodiments of the present invention. In FIG. 1, reference numeral 21 identifies the totality of computer programs to be compiled by the new compiler and also to be converted by the compiler conversion software. Reference numeral 25 identifies the totality of converted source code features generated by the compiler conversion software.

The present invention defines groups of converted source code features. Such a "group" includes one or more converted source code features. For each such group of converted source code features, the present invention performs testing to determine if said group of converted source code features has been correctly converted by the compiler conversion software to a given degree of confidence statistically. The processing of one of said groups, including the testing of the group, occurs during one "iteration" of the method of the present invention. In other words, the number of iterations is equal to the number of such groups.

In FIG. 1, one iteration 26 is shown for a group comprising M converted source code features 24, wherein the M source code features 24 appear in each computer program of P computer programs 22. The P computer programs 22 processed in the iteration 26 is a subset of the totality of computer programs 21. The M source code features 24 processed in the iteration 26 is a subset of the totality of converted source code features 25. FIG. 1 also illustrates that the P1 computer programs 23 to be tested in the iteration 26 is selected from the P computer programs 22 and is therefore a subset of the P computer programs 22.

Figure 2:
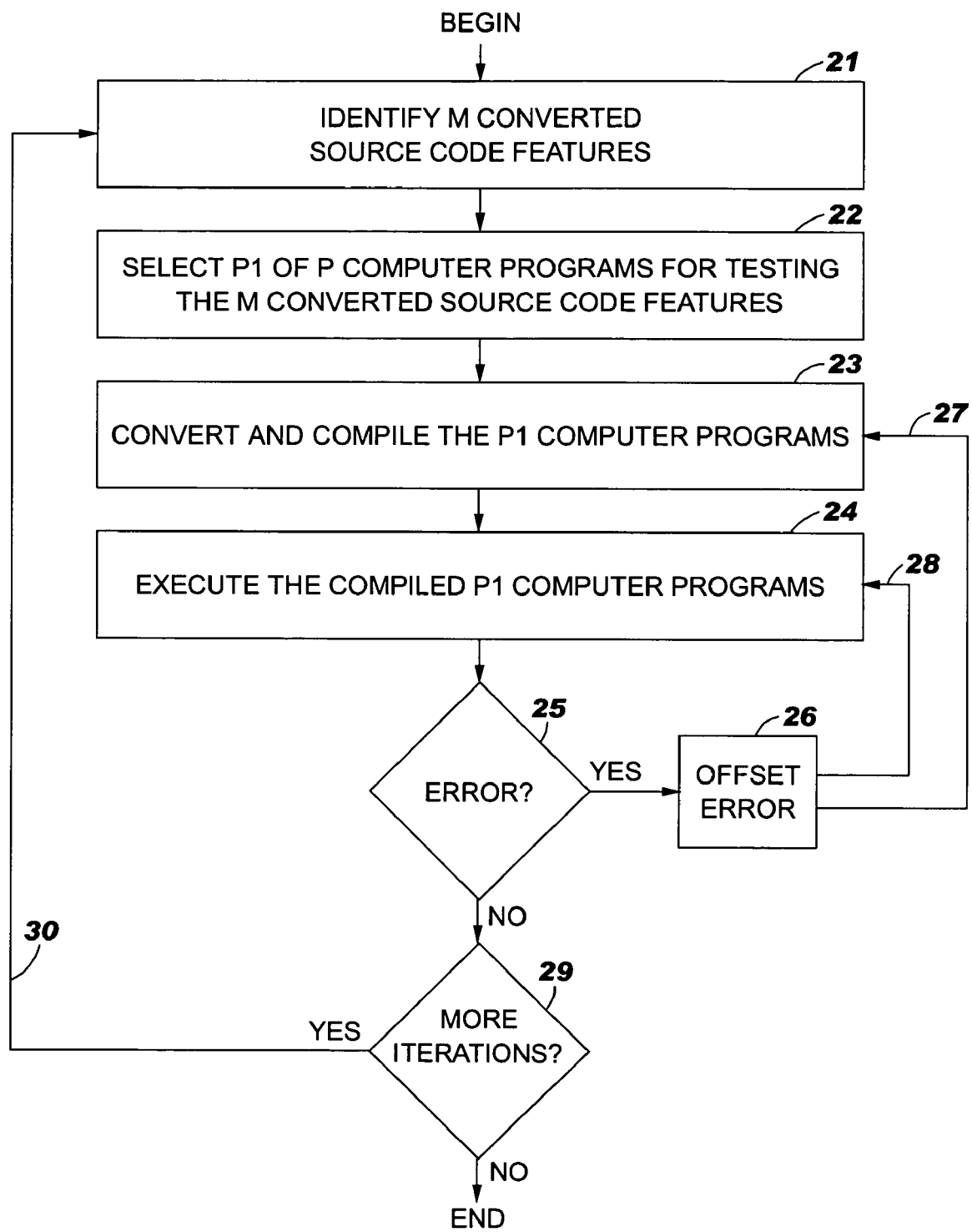
FIG. 2 is a flow chart depicting testing of converted source code features appearing in computer software of a computer system, in accordance with embodiments of the present invention.

FIG. 2 is a flow chart depicting testing of converted source code features appearing in computer software of a computer system, in accordance with embodiments of the present invention. In FIG. 2, steps 21-29 appear in an outer loop characterized by path 30 looping back to step 21 from step 29. This outer loop of FIG. 2 corresponds to the iteration 26 of FIG. 1. Thus each pass through steps 21-29 is a single iteration of the method of the present invention. Denoting N as the number of iterations (or outer loop traverses) to be performed, N is at least 1 (e.g., N=1, N=2 or more, etc.).

Step 21 identifies M converted source code features appearing in each computer program of P computer programs of the computer software. The M converted source code features have been converted by compiler conversion software in order that the P computer programs may be compiled into executable program codes by a new version of a compiler. P is at least 10. M is at least 1 (e.g., M=1, M=2 or more, etc.). The case of M=1 corresponds to the testing of exactly one converted source code feature in the iteration, whereas M>1 corresponds to the testing of a plurality of converted source code feature in the iteration.

Step 22 selects P1 computer programs of the P computer programs for subsequent testing of the P1 computer programs, wherein P1 is less than or equal to P. If P1 is less than P, however, there is a consequent reduction in the time and duration of testing. The P1 computer programs are selected such that the testing of the P1 computer programs may be used to determine to a degree of confidence whether the compiler conversion software has correctly converted the M source code features in the P computer program. Methods for determining a value of P1 will be discussed infra. The condition of P1 less than P constrains P to have a minimum value depending on the degree of confidence desired as will be discussed infra. The minimum value of P may be, inter alia, 15 corresponding to the formula of Equation (1), discussed infra, for a confidence factor of 95% and a confidence interval of 5%. One may have a smaller minimum value of P (e.g., 5, 10, etc.), however, if a lower degree of confidence is acceptable.

The P1 computer programs may be selected randomly, deterministically, or both randomly and deterministically. In an embodiment, the P1 computer programs are randomly selected from the P computer programs. In an embodiment, the P1 computer programs are randomly selected from a uniform distribution of the P computer programs. In an embodiment, the P1 computer programs are randomly selected from a non-uniform distribution of the P computer programs (e.g., the P computer programs may be weighted according to their importance or other criteria). In an embodiment, the P1 computer programs are deterministically selected from the P computer programs. For example, a particular group of the P1 computer programs may be selected for a particular reason such as a situation in which the particular group of the P1 computer programs are known to be more error prone with respect to the M converted source code features than are the remaining computer programs of the P computer programs. In an embodiment, at least one computer program of the P1 computer programs is randomly selected from the P computer programs. In an embodiment, at least one computer program of the P1 computer programs is deterministically selected from the P computer programs.

Step 23 uses the new version of the compiler to compile the P1 computer programs into corresponding executable program codes, after the P1 computer programs have been converted by the compiler conversion software.

Step 24 performs the testing of the P1 computer programs by executing the P1 executable program codes generated in step 23 and determining, to the degree of confidence desired (statistically), from said executing whether the compiler conversion software has correctly converted the M source code features in the P computer programs.

Based on the results of the testing in step 24, step 25 determines whether there is an error in the compiler conversion software causing a corresponding error to appear in the M converted source code features. If step 25 determines that there is an error in the compiler conversion software with respect to the M converted source code features, step 26 offsets the error in the compiler conversion software. In an embodiment, step 26 offsets the error in the compiler conversion software by correcting the compiler conversion software to prevent the error from occurring, followed by looping back to step 23 via path 27. In an embodiment, step 26 offsets in the error compiler conversion software by compensating for the error in the P computer programs (e.g., by making an offsetting error that cancels the error), followed by looping back to step 24 via path 28. In an embodiment, step 26 offsets in the error compiler conversion software by replacing and/or eliminating at least one source code feature of the M source code features in the P computer programs in a manner that preserves the functionality of the at least one source code feature, so that the at least one source code feature so replaced and/or eliminated is no longer subject to being erroneously converted by the compiler conversion software, followed by looping back to step 24 via path 28.

Step 29 determines if there are any more iterations to process. If step 29 determines that there are no more iterations to process then the method loops back to step 21 to perform the next iteration (i.e., process the next group of M converted source code features, wherein M is iteration dependent); otherwise the method ends.

For a given number (P) of computer programs processed during an iteration, the testing sample size (P1) may have any value less than or equal to P, as stated supra. For a given value of P and assuming that the P computer programs are distributed according to a binomial distribution, the sample size P1 may be determined from Equation (1).

$$P1 = (Z*Z*0.5*0.5/(CI*CI))/(1+((Z*Z*0.5*0.5/(CI*CI))-1)/P) \quad (1)$$

where Z is the number of standard deviations from the mean at an assumed confidence factor (CF) and CI is the confidence interval.

Using Equation (1), FIG. 3 is a table indicating a testing sample size (P1) for assessing whether a given number of computer programs (P) have been correctly converted by the compiler conversion software, for an assumed 95% confidence factor (i.e., Z=1.96 for CF=0.95) wherein the confidence interval CI is a function of special conditions, in accordance with embodiments of the present invention.

A special condition is a condition that warrants using a larger sample size P1 than if no special conditions are present. Special conditions include, inter alia: computer programs having known upgrade problem areas (e.g., the new compiler may not be able to process an old file system that is no longer supported by the operating system); upgrade options enabling the user to tailor the compiler conversion to the user's particular software (e.g., an end of file or an error in reading/writing the file may have changed and there is no standard way to convert, so the conversion needs to be tailored to the client's software via the upgrade options); latent syntax errors not detected by the previous compiler but detected by the new compiler, so that source code changes need to be made and tested independent of the testing of the P1 samples; manual changes made to the computer programs; critical functions existing in the computer programs, so that P1 should increase in light of the existence of the critical changes; and error prone programs which have exhibited numerous errors in the past.

In the table of FIG. 3, CI=0.05 for no special condition; CI=0.0375 for few (e.g., 1 to 2) special conditions; CI=0.025 for many (e.g., 3 to 4) special conditions, and CI=0 for many (e.g., greater than 4) special conditions. Note in Table 3 that P1=P for the "many" special conditions case. Note however that one may decide to use P1=P in other situations such as, inter alia, a situation in which all P computer programs are critical in their importance or impact.

The following example from the table of FIG. 3, illustrates how to interpret Equation (1) in the context of the present invention. In this example, CF=95% (i.e., Z=1.96), CI=0.025, P=10000, and P1=1332, which means that if the testing of the P1 (i.e., 1332) computer programs results in each of the 1332 computer programs executing correctly with respect to the M converted source code features, then there is a 95% probability that 97.5% of the P (i.e., 10000) computer programs will likewise execute correctly with respect to the M converted source code features. The 97.5% is (1−CI) expressed as a percent.

As stated supra, the P1 computer programs may be selected from the P computer programs such that P1 is less than P. For a given value of P, the value of P1 is an indication of the "degree of confidence" to which successful testing of the P1 computer programs (with respect to the M converted source code features) in accordance with the algorithm of FIG. 2 implies that the P computer programs would likewise be successfully tested with respect to the M converted source code features. As P1 increases with P fixed, the degree of confidence increases. Thus for P=100, there is a higher degree of confidence with P1=601 than with P1=600. Therefore, a selection of a value of P1, regardless of the method of selection, amounts to a selection of degree of confidence for a given P.

Upon completion of the algorithm depicted in FIG. 2, the method of the present invention may perform regression testing on a subset of the totality of computer programs 21 (see FIG. 1). Said subset may be equal to or less than the totality of computer programs 21. A regression test of a computer program is a test whose purpose is to determine whether the computer program is functioning correctly for essentially all functional purposes of the computer program. In contrast, the testing of the P1 computer programs in each iteration of FIG. 2 is directed to determining whether the compiler conversion software has correctly converted the M source code features.

Figure 4:
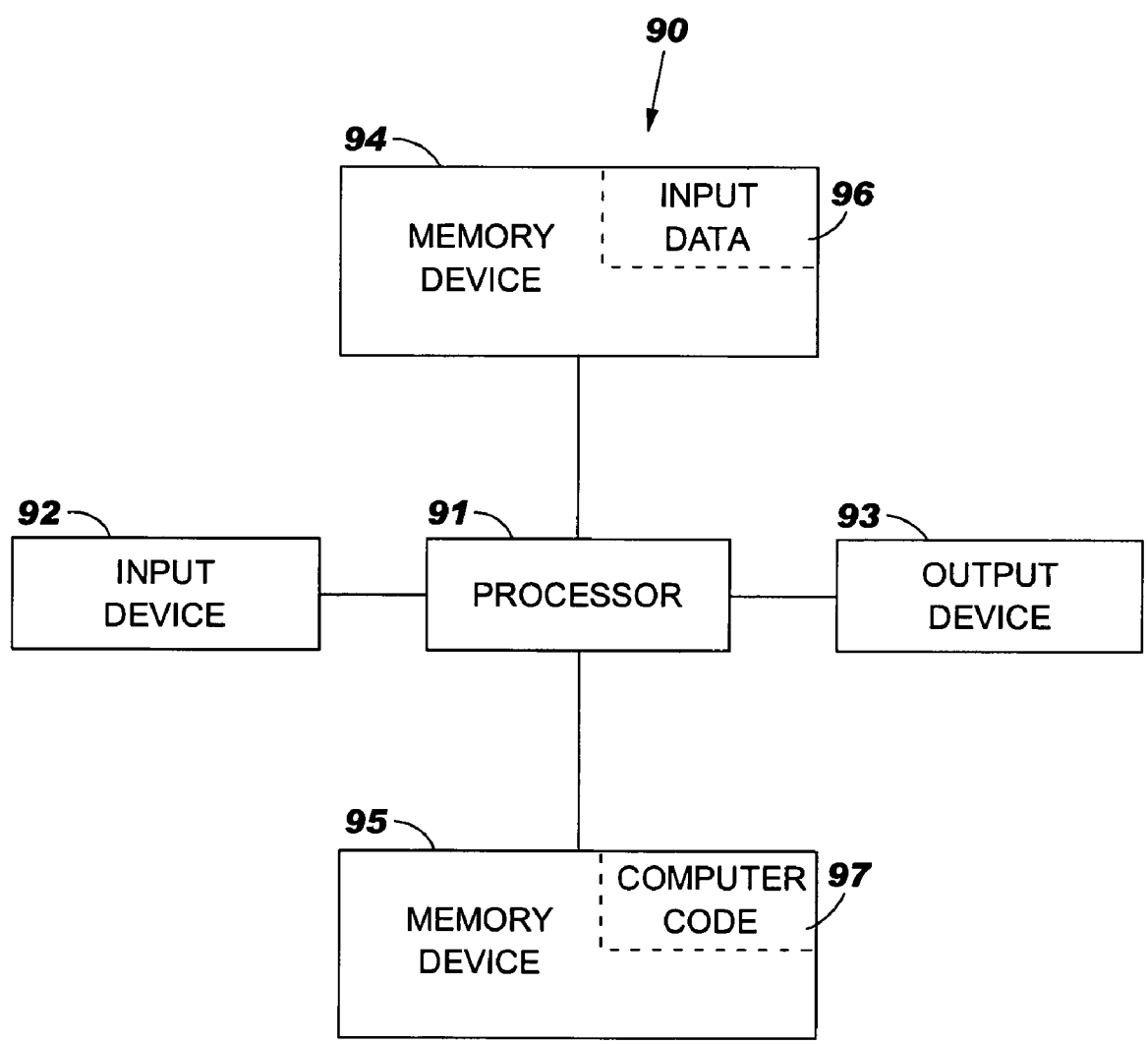
FIG. 4 illustrates a computer system used for testing converted source code features appearing in computer software of a computer system, in accordance with embodiments of the present invention.

FIG. 4 illustrates a computer system 90 used in conjunction with testing converted source code features appearing in the computer software of the computer system 90, in accordance with embodiments of the present invention. The computer system 90 comprises a processor 91, an input device 92 coupled to the processor 91, an output device 93 coupled to the processor 91, and memory devices 94 and 95 each coupled to the processor 91. The input device 92 may be, inter alia, a keyboard, a mouse, etc. The output device 93 may be, inter alia, a printer, a plotter, a computer screen, a magnetic tape, a removable hard disk, a floppy disk, etc. The memory devices 94 and 95 may be, inter alia, a hard disk, a floppy disk, a magnetic tape, an optical storage such as a compact disc (CD) or a digital video disc (DVD), a dynamic random access memory (DRAM), a read-only memory (ROM), etc. The memory device 95 includes a computer code 97. The computer code 97 includes an algorithm used in conjunction with testing converted source code features appearing in the computer software of the computer system 90. The processor 91 executes the computer code 97. The memory device 94 includes input data 96. The input data 96 includes input required by the computer code 97. The output device 93 displays output from the computer code 97. Either or both memory devices 94 and 95 (or one or more additional memory devices not shown in FIG. 4) may be used as a computer usable medium (or a computer readable medium or a program storage device) having a computer readable program code embodied therein and/or having other data stored therein, wherein the computer readable program code comprises the computer code 97. Generally, a computer program product (or, alternatively, an article of manufacture) of the computer system 90 may comprise said computer usable medium (or said program storage device).

While FIG. 4 shows the computer system 90 as a particular configuration of hardware and software, any configuration of hardware and software, as would be known to a person of ordinary skill in the art, may be utilized for the purposes stated supra in conjunction with the particular computer system 90 of FIG. 4. For example, the memory devices 94 and 95 may be portions of a single memory device rather than separate memory devices.

In implementing the algorithm of FIG. 2 by the computer code 97 of FIG. 4, step 21 of FIG. 2 may be implemented by, inter alia, having the computer code 97 extract a list of the M converted source code features from a file or a database. For step 22 of FIG. 2, the computer code 97 of FIG. 4 may select the P1 computer programs by any method discussed herein, such as from Equation (1) to determine the value of P1 and such as by randomly and/or deterministically selecting the P1 computer codes from the P computer codes. In step 23 of FIG. 2, the computer code 97 of FIG. 4 would utilize the compiler conversion software to convert the P1 computer programs, and the computer code 97 of FIG. 4 would utilize the new compiler to compile the P1 converted computer programs. In step 24 of FIG. 2, the computer code 97 of FIG. 4 would cause the P1 compiled computer programs to be executed. In step 25 of FIG. 2, the computer code 97 of FIG. 4 would determine the existence of error such as by comparing the results obtained from the testing of the P1 computer programs with the expected results.

While embodiments of the present invention have been described herein for purposes of illustration, many modifications and changes will become apparent to those skilled in the art. Accordingly, the appended claims are intended to encompass all such modifications and changes as fall within the true spirit and scope of this invention.

What is claimed is:

1. A method for testing converted source code features appearing in computer software of a computer system, said method comprising performing N iterations, said N being at least 1, wherein performing each iteration of the N iterations comprises performing the steps of:

identifying M converted source code features appearing in each computer program of P computer programs of said computer software, said M converted source code features having been converted by compiler conversion software in order that said P computer programs may be compiled into executable program codes by a new version of a compiler, said P being at least 10, said M being at least 1; and selecting P1 computer programs of said P computer programs for subsequent testing of said P1 computer programs, said P1 being less than said P, said P1 computer programs being selected such that said testing of the P1 computer programs may be used to determine to a statistical degree of confidence that said compiler conversion software has correctly converted said M source code features in said P computer programs, wherein performing each iteration of the N iterations further comprises performing the steps of:

compiling said P1 computer programs by the new version of the compiler into P1 corresponding executable program codes, after the P1 computer programs have been converted by the compiler conversion software; and performing said testing of said P1 computer programs by executing said P1 executable program codes and determining to said statistical degree of confidence from said executing whether said compiler conversion software has correctly converted said M source code features in said P computer programs.

2. The method of claim 1, wherein selecting said P1 computer programs comprises randomly selecting said P1 computer programs from said P computer programs.

3. The method of claim 2, wherein randomly selecting said P1 computer programs comprises randomly selecting said P1 computer programs from a uniform distribution of said P computer programs.

4. The method of claim 2, wherein randomly selecting said P1 computer programs comprises randomly selecting said P1 computer programs from a non-uniform distribution of said P computer programs.

5. The method of claim 1, wherein selecting said P1 computer programs comprises deterministically selecting said P1 computer programs from said P computer programs.

6. The method of claim 1, wherein selecting said P1 computer programs comprises randomly selecting at least one computer program from said P computer programs.

7. The method of claim 1, wherein selecting said P1 computer programs comprises deterministically selecting at least one computer program from said P computer programs.

8. The method of claim 1, wherein M=1 in each iteration of the N iterations.

9. The method of claim 1, wherein M is at least 2 for least one iteration of the N iterations.

10. The method of claim 1, wherein N=1.

11. The method of claim 1, wherein N is at least 2.

12. The method of claim 1, wherein P is at least 300.

13. The method of claim 1, wherein a determination is made from said executing that said compiler conversion software contains an error causing said compiler conversion software to incorrectly convert said M source code features in said P computer programs, and wherein performing each iteration of the N iterations further comprises performing the steps of:

offsetting said error; and repeating said performing step or said compiling and performing steps.

14. The method of claim 13, wherein said offsetting comprises correcting said error in said compiler conversion software, and wherein said repeating consists of repeating said compiling and performing steps.

15. The method of claim 13, wherein said offsetting comprises compensating for said error in said P computer programs, and wherein said repeating consists of repeating said performing steps.

16. The method of claim 13, wherein said offsetting comprises replacing and/or eliminating at least one source code feature of said M source code features in said P computer programs, and wherein said repeating consists of repeating said performing steps.

17. The method of claim 1, said method further comprising specifying a confidence factor and a confidence interval, wherein said degree of confidence is a function of said confidence factor and said confidence interval.

18. The method of claim 17, wherein said confidence factor is a same confidence factor for each iteration of the N iterations, and wherein said confidence interval is a same confidence interval for each iteration of the N iterations.

19. The method of claim 17, wherein said confidence interval is a function of an occurrence of one or more special conditions in at least one computer program of said P computer programs.

20. A computer program product, comprising a computer readable medium having a computer readable program code embodied therein, said computer readable program code comprising an algorithm adapted to implement a method for testing converted source code features appearing in computer software of a computer system, said method comprising the steps of:

identifying M converted source code features appearing in each computer program of P computer programs of said computer software, said M converted source code features having been converted by compiler conversion software in order that said P computer programs may be compiled into executable program codes by a new version of a compiler, said P being at least 10, said M being at least 1; and selecting P1 computer programs of said P computer programs for subsequent testing of said P1 computer programs, said P1 being less than said P, said P1 computer programs being selected such that said testing of the P1 computer programs may be used to determine to a statistical degree of confidence that said compiler conversion software has correctly converted said M source code features in said P computer programs, said P1 being less than P, wherein performing each iteration of the N iterations further comprises performing the steps of:

compiling said P1 computer programs by the new version of the compiler into P1 corresponding executable program codes, after the P1 computer programs have been converted by the compiler conversion software; and performing said testing of said P1 computer programs by executing said P1 executable program codes and determining to said statistical degree of confidence from said executing whether said compiler conversion software has correctly converted said M source code features in said P computer programs.

21. The computer program product of claim 20, wherein said method comprises selecting said P1 computer programs comprises randomly selecting said P1 computer programs from said P computer programs.

22. The computer program product of claim 20, wherein said method comprises selecting said P1 computer programs comprises deterministically selecting said P1 computer programs from said P computer programs.

23. The computer program product of claim 20, wherein said method comprises selecting said P1 computer programs comprises randomly selecting at least one computer program from said P computer programs.

24. The computer program product of claim 20, wherein said method comprises selecting said P1 computer programs comprises deterministically selecting at least one computer program from said P computer programs.

25. The computer program product of claim 20, wherein M is at least 2 at least for iteration of the N iterations.

26. The computer program product of claim 20, wherein a determination is made from said executing that said compiler conversion software contains an error causing said compiler conversion software to incorrectly convert said M source code features in said P computer programs, and wherein performing each iteration of the N iterations further comprises performing the steps of:

offsetting said error; and repeating said performing step or said compiling and performing steps.

27. The computer program product of claim 20, said method further comprising specifying a confidence factor and a confidence interval, wherein said degree of confidence is a function of said confidence factor and said confidence interval.

28. The computer program product of claim 27, wherein said confidence interval is a function of an occurrence of one or more special conditions in at least one computer program of said P computer programs.

29. A computer system comprising a processor and a computer readable memory unit coupled to the processor, said memory unit containing instructions that when executed by the processor implement a method for testing converted source code features appearing in computer software of said computer system, said method comprising the computer implemented steps of:

identifying M converted source code features appearing in each computer program of P computer programs of said computer software, said M converted source code features having been converted by compiler conversion software in order that said P computer programs may be compiled into executable program codes by a new version of a compiler, said P being at least 10, said M being at least 1; and selecting P1 computer programs of said P computer programs for subsequent testing of said P1 computer programs, said P1 being less than said P, said P1 computer programs being selected such that said testing of the P1 computer programs may be used to determine to a statistical degree of confidence that said compiler conversion software has correctly converted said M source code features in said P computer programs, said P1 being less than P, wherein performing each iteration of the N iterations further comprises performing the steps of:

compiling said P1 computer programs by the new version of the compiler into P1 corresponding executable program codes, after the P1 computer programs have been converted by the compiler conversion software; and performing said testing of said P1 computer programs by executing said P1 executable program codes and determining to said statistical degree of confidence from said executing whether said compiler conversion software has correctly converted said M source code features in said P computer programs.

30. The computer system of claim 29, wherein said method comprises selecting said P1 computer programs comprises randomly selecting said P1 computer programs from said P computer programs.

31. The computer system of claim 29, wherein said method comprises selecting said P1 computer programs comprises deterministically selecting said P1 computer programs from said P computer programs.

32. The computer system of claim 29, wherein said method comprises selecting said P1 computer programs comprises randomly selecting at least one computer program from said P computer programs.

33. The computer system of claim 29, wherein said method comprises selecting said P1 computer programs comprises deterministically selecting at least one computer program from said P computer programs.

34. The computer system of claim 29, wherein M is at least 2 at least for iteration of the N iterations.

35. The computer system of claim 29, wherein a determination is made from said executing that said compiler conversion software contains an error causing said compiler conversion software to incorrectly convert said M source code features in said P computer programs, and wherein performing each iteration of the N iterations further comprises performing the steps of:
   offsetting said error; and
   repeating said performing step or said compiling and performing steps.

36. The computer system of claim 29, said method further comprising specifying a confidence factor and a confidence interval, wherein said degree of confidence is a function of said confidence factor and said confidence interval.

37. The computer system of claim 36, wherein said confidence interval is a function of an occurrence of one or more special conditions in at least one computer program of said P computer programs.

* * * * *

UNITED STATES PATENT AND TRADEMARK OFFICE
CERTIFICATE OF CORRECTION

PATENT NO. : 7,587,708 B2  Page 1 of 1
APPLICATION NO. : 10/894839
DATED : September 8, 2009
INVENTOR(S) : Robert L. King It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1449 days.

Signed and Sealed this

Twenty-first Day of September, 2010

David J. Kappos
*Director of the United States Patent and Trademark Office*